Patented Feb. 12, 1946

2,394,773

UNITED STATES PATENT OFFICE 2,394,773

METAL PICKLING

William H. Hill, Mount Lebanon, Pa., assignor to American Cyanamid Company, New York, N. Y., a corporation of Maine No Drawing. Application October 11, 1943, Serial No. 505,840

4 Claims. (Cl. 252—148)

This invention relates to the preparation of pickling inhibitors. More particularly, the invention relates to the preparation and use of aldehyde condensation products of the sulfides of melamines as pickling inhibitors. This is a continuation in part of my co-pending application, Ser. No. 369,562, filed December 11, 1940.

Such substances inhibit the solvent action of pickling acids on metals but still permit the acid to clean and remove scale, rust, oxides and the like from the metal surface. In the past, a number of compounds have been used as inhibitors in acid cleaning and pickling baths, however, such preparations have not been very satisfactory when used as inhibitors. For example, some of these products though found to have satisfactory inhibiting effect are very difficultly soluble in acids. In order to use them they have to be boiled in the concentrated acid before dilution with water to normal pickling strength; others are readily volatilized and hence lose their effectiveness, especially when used in a heated pickling bath; still others must be used in large proportions and are therefore neither economical nor efficient.

It is the principal object of this invention to prepare a pickling inhibitor which is effective in extremely dilute proportions. A further object is to provide an inhibitor which is cheap and easy to make. A still further object is to prepare an acid soluble inhibitor. Other and further objects and advantages will become apparent in the description of the invention, particularly as given in the illustrative examples.

It has been found that the reaction products of melamine sulfides with aldehydes are efficient inhibitors for acid pickling and cleaning solutions. These products are readily soluble in various pickling baths in the required amounts necessary for effective operation. Only a very small amount, usually a fraction of one percent, of any inhibitor composition of this invention is sufficient.

The products of this invention are prepared by making an aqueous or an alcoholic solution or slurry of the particular melamine, passing hydrogen sulfide into the mixture until reaction ceases, filtering the solution where necessary and condensing the filtrate with an aldehyde, such as formaldehyde in aqueous solution. The condensation product is then dissolved in a diluted acid solution where it permits the acid of the pickling bath to attack the unclean or oxidized portions of the metal surface while protecting the clean portions from corrosive or further acid attack.

Thus, iron and steel articles coated with scale and dirt can be effectively cleaned while preventing substantial loss of the metal by its reaction with the pickling acid to liberate hydrogen. The advantage of an effective inhibitor is twofold: it allows the acid to dissolve the iron oxide, scale, etc., but it substantially prevents the pickling acid from attacking the metal surface itself. Dissolution of metal in a pickling bath is undesirable because this weakens the acid bath and in addition causes a pitting and roughening of the surface. This is undesirable if a smooth surface for subsequent painting or metal coating is desired.

In order that this invention may be more fully and clearly understood, the following example is given:

*Example*

150 g. of melamine was suspended in water and the aqueous slurry saturated with hydrogen sulfide. When a 40% aqueous solution of formaldehyde was added in excess, the melamine reaction mixture dissolved and after several hours a grey resin precipitated out, which was filtered and washed with water.

A pickling solution was prepared using 250 cc. of concentrated hydrochloric acid diluted with 500 cc. of water. Three tenths of one gram of the above melamine sulfine resin were dissolved therein. Two nails were added and showed very little hydrogen to be evolved. A control solution containing two nails in a similar pickling acid except that melamine instead of the sulfine resin was added showed that the melamine was not as good an inhibitor, for, after three days the nails in the control solution were black and split at the tips and after 4 days these same nails were black and badly corroded whereas the sulfine resin protected nails were still bright after 4 days submersion.

The compounds produced as above described are very effective acid inhibitors and require the addition of only very small amounts to a pickling bath in order to inhibit the solvent action of the acid in the bath on metal. In order to show the superiority of the products of this invention over the standard inhibitors of the trade, a commonly incorporated commercial inhibitor was used in one set of tests and the above melamine sulfine resin in another set of tests. The efficiency of the products was determined in the following manner:

The inhibiting efficiency was determined by weighing small strips of scale-free steel, S. A. E. 1010, 26 gauge and size 3" × 4", comparing the loss in weight sustained in inhibited 5% sulfuric acid at 180° F. ± 2° with the loss in weight sustained by similar pieces of steel in 5% sulfuric acid containing no inhibitor. Various strengths of inhibitor were used.

The inhibiting efficiency was then calculated from the following expression:

$$100 - \left(100 \times \frac{\text{loss in grams of inhibited bath specimen}}{\text{loss in grams of blank bath specimen}}\right)$$

The results are given in the following table:

| Commercial inhibitor | Inhibitor strength, per cent | Inhibiting efficiency | | |
|---|---|---|---|---|
| | | First 30 minutes | Next 60 minutes | Next 60 minutes |
| | 0.00625 | 87 | 93 | 92 |
| | 0.01250 | 92 | 96 | 96 |
| | 0.02500 | 95 | 97 | 98 |
| Melamine sulfine resin. | 0.00625 | 92 | 97 | 98 |
| | 0.01250 | 93 | 97 | 98 |
| | 0.02500 | 95 | 98 | 98 |

From these tests it will be seen that the acid inhibitors of this invention surpass, in efficiency, the usual run of inhibitor now used commercially.

In addition to melamine sulfides, various other substituted melamine sulfides such as methyl, ethyl, butyl, propyl and other alkyl, aralkyl and aryl substituted melamine sulfides can be prepared and used in order to obtain an aldehyde condensation product having valuable inhibiting properties.

Although, in the examples given, formaldehyde has been specifically mentioned, any other aldehyde may be used such as paraformaldehyde, crotonaldehyde, acetaldehyde, among numerous others. Also, various other acids such as sulfuric, formic, citric, tartaric, acetic, lactic, phosphoric, and hydrofluoric may be used with these inhibitors.

In the preparation of the metal surface for the pickling bath, it is preferable to first free the metal from grease by dipping in an organic solvent or an alkali or by the addition of a wetting agent. In the example, the concentration of the acid or the temperature of the solution may be varied as desired. The proportions of the inhibitors used may vary likewise, relatively large proportions may at times be necessary to reduce the corrosion of the metal to a minimum. In general, a quantity of between one tenth of a gram and one gram per 100 grams of actual acid content will be found sufficient, one half of a gram being usually preferred.

It is to be noted that the products of this invention readily attack oxides and scale with a minimum loss of free metal. In every instance, the primary purpose of a pickling bath is the removal of undesirable deposits and incrustations. In particular, ferrous metals pickled with the products of this invention are cleaned and magnetic blue oxides, phosphates, etc., removed, and the metals acquire a superior finish, with pitting almost completely eliminated. Moreover, the amount of metal and acid consumed is unusually small.

Since many modifications may be made in the foregoing example, it is to be understood that still other embodiments differing in scope from the above example can be readily made without exceeding the bounds of this invention which is to be limited only by the scope of the appended claims.

I claim:

1. An inhibitor composition for pickling ferrous metals comprising a non-oxidizing pickling acid solution and a condensation product of formaldehyde with the reaction product of hydrogen sulfide and a melamine.

2. The process of cleaning and pickling metals which comprises subjecting the metals to the action of a non-oxidizing acid which contains a condensation product of formaldehyde with the reaction product of hydrogen sulfide and a melamine.

3. A pickling bath for iron and steel articles comprising a non-oxidizing acid and a .006 to .025% solution of a condensation product of formaldehyde with the reaction product of hydrogen sulfide and a melamine.

4. A pickling inhibitor for ferrous metals comprising a condensation product of formaldehyde with the reaction product of hydrogen sulfide and a melamine.

WILLIAM H. HILL.